United States Patent
Boher et al.

(10) Patent No.: US 8,077,766 B2
(45) Date of Patent: Dec. 13, 2011

(54) METHOD AND DEVICE FOR RECEIVING A DATA SIGNAL CONSISTING OF SYMBOL BLOCKS AND CORRESPONDING COMPUTER PROGRAM

(75) Inventors: Laurent Boher, Rennes (FR); Maryline Helard, Rennes (FR); Rodrigue Rabineau, Rennes (FR)

(73) Assignee: France Telecom, Paris (FR)

( * ) Notice: Subject to any disclaimer, the term of this patent is extended or adjusted under 35 U.S.C. 154(b) by 413 days.

(21) Appl. No.: 12/294,728

(22) PCT Filed: Mar. 9, 2007

(86) PCT No.: PCT/FR2007/050904
§ 371 (c)(1),
(2), (4) Date: Jun. 2, 2009

(87) PCT Pub. No.: WO2007/110522
PCT Pub. Date: Oct. 4, 2007

(65) Prior Publication Data
US 2010/0150220 A1    Jun. 17, 2010

(30) Foreign Application Priority Data
Mar. 27, 2006 (FR) .................................... 06 02663

(51) Int. Cl.
*H03H 7/30* (2006.01)
*H04B 1/10* (2006.01)

(52) U.S. Cl. ........................................ 375/232; 375/350

(58) Field of Classification Search .................. 375/232, 375/350
See application file for complete search history.

(56) References Cited

U.S. PATENT DOCUMENTS
2002/0114408 A1*  8/2002  Hamalainen .................. 375/329
2004/0042543 A1*  3/2004  Li et al. ......................... 375/222
2006/0171483 A1*  8/2006  Jia et al. ........................ 375/267

FOREIGN PATENT DOCUMENTS
EP        1453262        9/2004

OTHER PUBLICATIONS

Bouvet, P-J et al.: "Low Complexity Iterative Receiver for Non Orthogonal Spacetime Block Code With Channel Coding", Vehicular Technology Conference, 2004. VTC2004-Fall, 2004 IEEE 60th Los Angeles, CA, USA Sep. 26-29, 2004, Piscataway, NJ, USA, IEEE, Sep. 26, 2004.

(Continued)

*Primary Examiner* — Don N Vo
(74) *Attorney, Agent, or Firm* — David D. Brush; Westman, Champlin & Kelly, P.A.

(57) ABSTRACT

A method is provided for receiving a received data signal including at least one symbol block received and representative of a source signal. The method includes at least one iteration for improving an estimate of the received signal and including the following steps, for a current equalized symbol block: obtaining one or more decided bits, by bit-by-bit decoding a current subset of bits; updating one or more symbols, according to the decoded bit or bits, delivering an updated block of estimated symbols; determining a block of equalized symbols enhanced by canceling interferences, taking account of the updated block of estimated symbols.

8 Claims, 4 Drawing Sheets

OTHER PUBLICATIONS

Dejonghe, A. et al.: "A Comparison of Bit and Symbol Interleaving in MMSE Turbo-Equalization", ICC 2003-2003 IEEE International Conference on Communications, Anchorage, AK, May 11-15, 2003, IEEE International Conference on Communications, New York, NY, IEEE, US, vol. 1 of 5—pp. 2928-2932, Nov. 5, 2003.

Sellathurai, M. et al.: "Turbo-Blast for Wireless Communications: Theory and Experiments", IEEE Transactions on Signal Processing, vol. 50, No. 10, pp. 2538-2546, 2002.

Tonello, A. M.: "Space-time bit-interleaved Coded Modulation With an Iterative Decoding Strategy", in proceedings of VTC Fall '00, Boston, USA, Sep. 2000.

Witzke M. et al.: "Iterative Detection of MIMO Signals With Linear Detectors", 36th Asilomar Conference on Signals, Systems and Computers, vol. 1, pp. 289-293, Nov. 2002.

French Search Report of Foreign Counterpart Application No. FR 06/02663 Filed on Mar. 27, 2006.

International Search Report of Counterpart Application No. PCT/FR2007/050904 filed on Mar. 9, 2007.

* cited by examiner

METHOD AND DEVICE FOR RECEIVING A DATA SIGNAL CONSISTING OF SYMBOL BLOCKS AND CORRESPONDING COMPUTER PROGRAM

CROSS-REFERENCE TO RELATED APPLICATIONS

This application is a Section 371 National Stage Application of International Application No. PCT/FR2007/050904, filed Mar. 9, 2007 and published as WO 2007/110522 on Oct. 4, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of disclosure is that of digital communications. More precisely, in a system of digital communications, the disclosure relates to a technique for receiving a received data signal formed by symbol blocks each formed by a set of bits.

The disclosure relates more particularly to a technique of iterative reception implementing an interference cancellation mechanism that affects one or more symbols of the received signal.

The term "interferences" is understood here and throughout this document to mean any type of disturbance (or combination of disturbances) that could affect the received signal, such as for example inter-symbol interference (ISI), co-antenna interference, interference due to pre-encoding etc.

The disclosure can be applied especially, but not exclusively, to wireless communications systems (radio transmission) having one or more transmission and/or receive antennas, such as SIMO (single-input and multiple-output), SISO (single-input and single-output), MIMO (multiple-input and multiple-output), MISO (multiple-input and single-output) and other systems implementing single-carrier or multi-carrier modulation.

BACKGROUND OF THE DISCLOSURE

A discussion follows here below of the techniques of the prior art with reference to the particular case of MIMO-OFDM systems, i.e. multiple-input and multiple-output multi-antenna communication systems implementing orthogonal frequency division multiplexing (OFDM).

MIMO-OFDM systems can be used especially to implement iterative reception techniques which, as and when the iterations are done, improve the quality of the estimation of the sent signal as a function of the received signal.

As shall be seen here below, these techniques rely on a successive and repeated implementation of elementary modules so that these different modules exchange information on the reliability of the operation performed.

There are very many known techniques of iterative reception for multiple antennas systems in transmission and/or in reception.

These iterative techniques include especially:
receivers implementing an maximum likelihood (ML) type algorithm which have the drawback of inducing high processing complexity;
receivers based on linear filters such as those proposed by M. Sellathurai and S. Haykin in Turbo-blast for wireless communications: theory and experiments, IEEE Transactions on Signal Processing, Vol. 50, No. 10, pp. 2538-2546, 2002. These receivers rely on MMSE (minimum mean square error) type filtering techniques and interference cancellation. They have the advantage, as compared to maximum likelihood receivers, of being far less complex.

Certain of the algorithms implemented in receivers based on linear filters, and this is the case of an embodiment of the present invention, rely on an approximation in which the estimation of the symbols is considered to be perfect as of the second equalization, for the computation of the coefficients of the equalization filter (also called a total equalization block here below) which are then computed only twice for each block.

Referring to FIG. 1, a description is now made of the classic functional sequence of a transmission device 100 (commonly called a transmitter) of a source signal 10 formed by binary elements in a MIMO-OFDM type transmission context.

The (binary) source signal 10 to be sent undergoes a channel encoding CC11 and then a Π interleaving 12. It then goes through a "mapping module M, 13 intended to convert binary elements or bits into complex symbols: a module of this kind thus associates a group of bits with a complex symbol belonging to a constellation (of a QPSK, 16 QAM or other type). The sequence of symbols output from the mapping module M 13 is commonly called an M-ary signal. A space-time block encoding 14 is then performed for each group of Q symbols which are then modulated in blocks $15_1$, $15_2$ to $15_{Nt}$ according to an OFDM type multi-carrier modulation technique, and then sent on $N_t$ transmission antennas $16_1$, $16_2$ to $16_{Nt}$.

As illustrated in FIG. 2, the classic functional chain of a reception device 200 (commonly called a receiver) of a signal sent by the above-mentioned transmission device 100 has two stages, namely a "space-time decoder" 24 (i.e. a converter of symbols into bits) and a channel decoder 26 which exchanges extrinsic or a posteriori information in an iterative loop until the receiver converges. These stages may be separated especially by an interleaver $22_i$, used to decorrelate the outputs and then give them to the next decoding stage. In other words, the information exchanged will be decorrelated from one stage to another.

Thus, a signal r is received on $N_R$ receive antennas referenced $25_1$ to $25_{N_R}$, then demodulated into blocks $27_1$, $27_2$ to $27_{NR}$, according to a demodulation technique which is the reverse of the multi-carrier technique implemented at transmission Each receive antenna $25_1$ to $25_{N_R}$ receives a linear combination of the symbols sent on each of the $N_t$ transmit antennas. The first decoding stage 24 comprises a first space-time linear decoding block 20 (here below also called a total equalization block) according to a criterion, for example an MMSE or "zero forcing>> (ZF) type criterion. The equalized signal $\tilde{s}^{(p)}$ output from the space-time decoding block 20 is then fed into a "demapping" module $M^{-1}$ $23_1$, and then undergoes a de-interleaving operation $\Pi^{-1}$ $22_1$ and then a channel decoding $CC^{-1}$ 21. At output of the second channel decoding stage 26, an estimated flexible binary signal $\hat{d}$ is obtained on the encoded bits (it may be recalled that the bits used in the iterative process are called "flexible" because their value depends on the probability of the bits).

Since the method is iterative, this estimated flexible binary signal $\hat{d}$ is subjected to another interleaving $\Pi$ $22_2$ and another "mapping" M $23_2$, in order to obtain an estimated M-ary signal $\tilde{s}^{(p)}$ that can be re-injected into the space-time decoding block 20 for a following iteration to improve the estimation of the signal received.

At the first iteration, the receiver carries out a classic equalization of the received signal because no estimated signal is available. At the following iterations on the contrary, the previously estimated symbols are used by the equalizer to cancel one or more interferences affecting the received signal.

Classically, receivers based on linear filters implement interference-cancellation mechanisms that rely on the use of blocks of symbols.

According to this iterative reception technique, it is necessary for all the bits that form the symbols of a space-time block to be decoded in order to subtract the interferences affecting the symbols which form the received signal.

More specifically (referring to FIG. 2), the "demapping" module $M^{-1}$ $23_1$, which works symbol by symbol receives a block 201 of equalized symbols formed by Q equalized symbols (corresponding to the equalized symbol $\hat{s}^{(p)}$) and delivers packets 202 of nb converted bits.

The de-interleaving module $\Pi^{-1}$ $22_1$ processes all the nb converted bits, bit block by bit block (the bit block having a size equal to the de-interleaving size of the module $22_1$), and delivers blocks 203 of de-interleaved blocks.

The channel decoding module $CC^{-1}$ 21 receives the blocks 203 of de-interleaved bits and, after a certain latency, delivers blocks 204 of decoded bits formed by one or more bits.

The interleaving module $\Pi^{-1}$ $22_2$ processes all the blocks 204 of decoded bits, bit block by bit block (the bit block having a size equal to the interleaving size of the module $22_2$), and delivers blocks 205 of interleaved bits.

Then, the mapping module M $23_2$, which works by packets of nb bits, receives the blocks 205 of interleaved bits and delivers estimated symbols 206.

Finally, the total equalization block 20 waits to have Q estimated symbols at input to determine a block of equalized symbols improved by interference cancellation.

Referring now to FIG. 3, a description shall be provided of the classic functional chain of an MMSE-IC (MMSE interference canceller according to an MEQM or mean quadratic error minimization criterion) implemented by the above-mentioned reception device 200.

For the sake of clarity, the following notations will be used here below in the document:

H designates a matrix representing the transmission channel of the sent signal 10;

I designates an identity matrix sized Q×Q;

$\sigma^2=1/SNR$ is the variance of the equivalent noise, also equal to the reverse of the mean signal-to-noise ratio (SNR) observed on each receive antenna; and $G=H^H \cdot H$ is a total equalization matrix.

The interference cancellation mechanism 300 receives the estimated M-ary signal $\tilde{s}^{(p)}$ and the received signal r at input. It performs the following operations:

adapted filtering $30_2$ of the received signal r by application of the transconjugate matrix of the channel $H^H$ delivering a filtered signal;

creation $30_1$ of the interference from an estimated M-ary signal $\tilde{s}^{(p)}$ by left multiplication of this estimated M-ary signal $\tilde{s}^{(p)}$ by an interference matrix $J=G-diag(G)$. More generally, this interference matrix must at least take account of the channel matrix H;

subtraction of the interferences obtained at output of the block referenced $30_1$ from the filtered signal obtained at output of the filtering block $30_2$ to obtain an improved signal;

equalization $30_3$ of the improved signal delivering an equalized M-ary signal $\hat{s}^{(p)}$ by application of the matrix $(diag\ (G)+\sigma^2 I)^1$. More generally, this equalization matrix must at least take account of the channel matrix H.

Thus, according to this technique of iterative reception, a cancellation of interferences is done after the complete estimation of a block of symbols.

One drawback of this prior art technique is that it cannot be used for optimal management of the computing power of the receiver because of the sequential execution of the different elementary modules of the iterative loop. Indeed, a sequencing of this kind consists of the computation, one by one, of the estimated symbols and the rebuilding as and when an estimated symbol becomes available, of a block of estimated symbols to carry out the cancellation of the interference. In other words, for a given block of equalized symbols, it is necessary to await the estimation of all the symbols to execute the operations relating to the cancellation of interference. These operations are therefore distributed non-uniformly in that the cancellation of interference can only be done after retrieval of all the decoded and then re-interleaved bits of the space-time block.

The inventors have furthermore noted that the sequential management of the elementary modules of a receiver may prompt an increase in the processing time at reception when the interference cancellation operations are processed in series or an increase in the complexity of the receiver when they are processed in parallel.

SUMMARY

One or more embodiments of the invention proposes a solution that does not have these drawbacks of the prior art in the form of a method of reception of a received data signal formed by at least one received block of symbols and representing a source signal. The reception method implements an initialization phase comprising a step of block-to-block equalization of said received signal delivering, for each block of received signals, a block of equalized symbols each formed by one set of bits.

According to an embodiment of the invention, a reception method of this kind comprises at least one iteration of improvement of an estimation of said received signal comprising the following steps for a current block of equalized symbols:

obtaining at least one decoded bit, by bit-to-bit decoding of a current subset of at least one bit belonging to said current block of equalized symbols;

updating at least one symbol estimated during said initialization phase or updated during a previous iteration of improvement, as a function of the decoded bit or bits, delivering an updated block of estimated symbols, constituted by the decoded bit or bits and at least one bit decoded during at least one previous improvement iteration or during said initialization phase;

determining a block of equalized symbols improved by cancellation of interference, taking account of said updated block of estimated symbols, said improved block of equalized symbols becoming the current block of equalized symbols of any subsequent iteration.

Thus, an embodiment of the invention is based on a wholly novel and inventive approach to the techniques of iterative reception of signals with interference cancellation. Indeed, the method of an embodiment of the invention enables the iterative decoding of an encoded signal (or possibly a signal that has been linearly pre-encoded and/or subjected to space-time encoding), using an interference-cancellation type equalizer whose coefficients are corrected after each decoded bit and no longer after a full estimation of the blocks of symbols as proposed by the techniques of the prior art. Thus, there is obtained a rapid convergence of the signal estimation process towards the optimum limits of convergence with a reduced number of operations (with computation of LLR or Log-Likelihood Ratio), computation of the phase or quadrature components of a symbol, interference cancellation and equalization, etc).

It is important to note that the term "bit-to-bit" decoding is understood to mean several schemes for decoding one frame of bits (1 bit to 1 bit, 2 bits to 2 bits, 3 bits to 3 bits, etc) except for the case where all the bits of a symbol are decoded in only one iteration.

According to a particular characteristic of an embodiment of the invention, said obtaining step comprises the following steps:
   extracting at least one bit from one of said equalized symbols, called extracted bits;
   updating said current subset from at least one of said extracted bits, delivering an updated subset;
   channel decoding of said updated subset, delivering the decoded bit or bits.

According to a particular embodiment, said obtaining step implements a de-interleaving of said sets of bits of said equalized symbols of said current block of equalized symbols, which is the reverse of an interleaving implemented at transmission. According to a particular aspect of an embodiment of the invention, said de-interleaving renders, in an original order, the bits interleaved at transmission according to a interleaving that distributes said bits uniformly in said blocks of symbols and ensures that two bits consecutively associated with a symbol block will be transmitted in two distinct symbols.

The term <<uniformly>> refers to the fact that $nb_{block}$ consecutive bits are transmitted in $nb_{block}$ different bit blocks where $nb_{block}$ is the number of bit blocks contained in a frame. In particular, the number $nb_{block}$ is chosen such that the length of the frame is equal to the multiplication of the order of modulation (i.e. number of bits per symbol), of the number of symbols per block and of the number of blocks.

According to a particular characteristic of an embodiment of the invention, said de-interleaving is such that two consecutive de-interleaved bits come from two distinct positions of bits within two distinct blocks of equalized symbols.

In particular, for an interleaver sized $T=nb_{bloc}*Q*nb_{bit}$ and for a given bit which, before de-interleaving, occupies an initial position defined by:

$$b*Q*nb_{bit}+s*nb_{bit}+p$$

said de-interleaving is such that said bit, after de-interleaving, occupies a final position defined by:

$$\Pi_p(p,s,\Pi_b(b))*Q*nb_{bloc}+\Pi_s(s,\Pi_b(b))*nb_{bloc}+\Pi_b(b)$$

where:
$nb_{block}$ corresponds to the number of blocks of symbols;
Q corresponds to the number of symbols forming one of said blocks;
$nb_{bit}$ corresponds to the number of bits forming one of said symbols;
$\Pi_b(b)$ designates the relationship enabling the distribution of the blocks of symbols;

$\Pi_s(s,\Pi_b(b))=(s-\Pi_b(b))\mod(Q)$ designates the relationship enabling the distribution of the symbols within each block of symbols;
$\Pi_p(p,s,\Pi_b(b))=(p-\Pi_b(b)-\epsilon*(\Pi_b(b)/Q)+\Pi_s(s,\Pi_b(b)))\mod(nb_{bit})$ designates the relationship enabling the distribution of the bits within each symbol;
with:

$$\varepsilon = \begin{cases} 1 & \text{if } Q\mod(nb_{bit}) = 0 \\ 0 & \text{if } Q\mod(nb_{bit}) > 0 \end{cases}$$

In another embodiment, the invention concerns a device for the reception of a received data signal formed by at least one received block of symbols representing a source signal, the reception device comprises initialization means comprising means of block-to-block equalization of said received signal delivering, for each block of received signals, a block of equalized symbols each formed by one set of bits and means of improvement of an estimation of said received signal implementing at least once, in the form of an iteration and for a current block of equalized symbols:
   means for obtaining at least one decoded bit, by bit-to-bit decoding of a current subset of at least one bit belonging to said current block of equalized symbols;
   means for updating at least one symbol estimated during said initialization phase or updated during a previous iteration of improvement, as a function of the decoded bit or bits, delivering an updated block of estimated symbols, constituted by the decoded bit or bits and at least one bit decoded during at least one previous improvement iteration or during said initialization phase;
   means for determining a block of equalized symbols improved by cancellation of interference, taking account of said updated block of estimated symbols, said improved block of equalized symbols becoming the current block of equalized symbols of any subsequent iteration.

A reception device such as this is especially suited to implementing the reception method described here above.

Another aspect of an embodiment of the invention relates to a computer program product downloadable from a communications network and/or recorded on a computer-readable carrier and/or executable by a processor, comprising program code instructions for the execution of the steps of the reception method described here above when the program is executed on a computer.

BRIEF DESCRIPTION OF THE DRAWINGS

Other features and advantages of embodiments of the invention shall appear more clearly from the following description of a particular embodiment, given by way of a simple illustrative and non-exhaustive example, and from the appended drawings, of which.

DETAILED DESCRIPTION OF ILLUSTRATIVE EMBODIMENTS

The general principle of an embodiment of the invention relies on an iterative reception of a received data signal formed by blocks of symbols and representing a source signal. This iterative reception implements interference cancellation from an interference canceller type equalizer whose coefficients are updated after each decoded bit and no longer after a complete estimation of the blocks of symbols. Thus, a linear equalization is performed on the received signal, this linear equalization being efficient in terms of number of operations to be performed during a iteration.

This iterative reception may be implemented in a context of single-antenna or multi-antenna transmission, in a system which may or may not be a multi-user system, with or without linear pre-encoding at transmission, in single-carrier or multi-carrier mode. It can also be applied to systems implementing lattice-encoded modulations.

Figure 4:
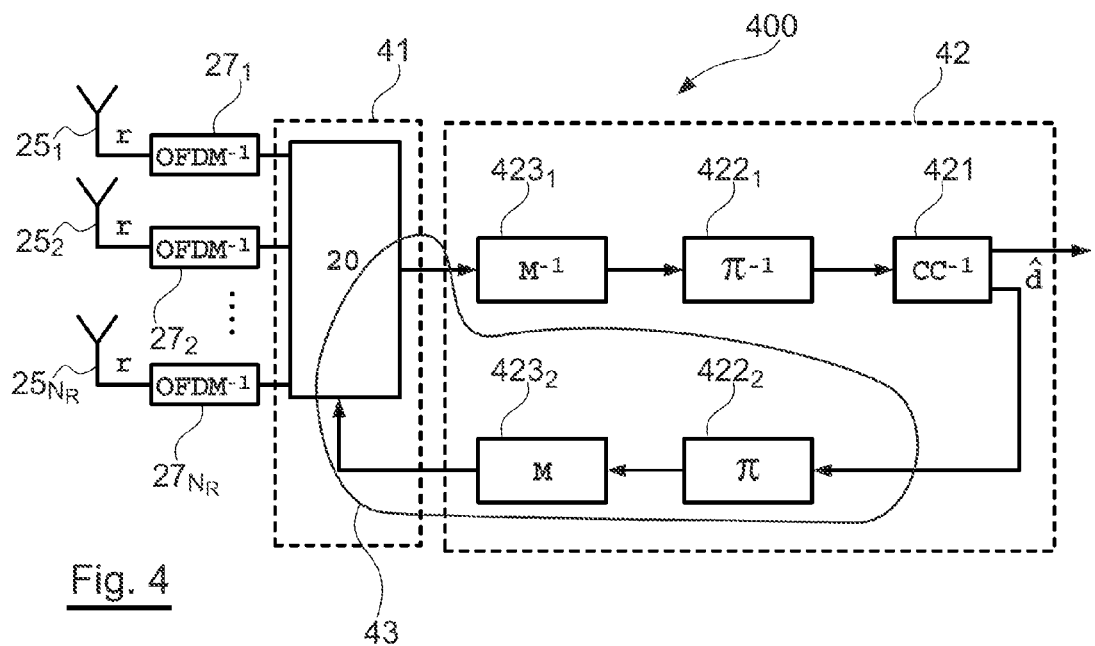
FIG. 4 illustrates the structure of a particular embodiment of a receiver according to an embodiment of the invention.

Referring now to FIG. 4, a description is provided of a functional chain of a reception device 400 according to one embodiment of the invention.

Figure 1:
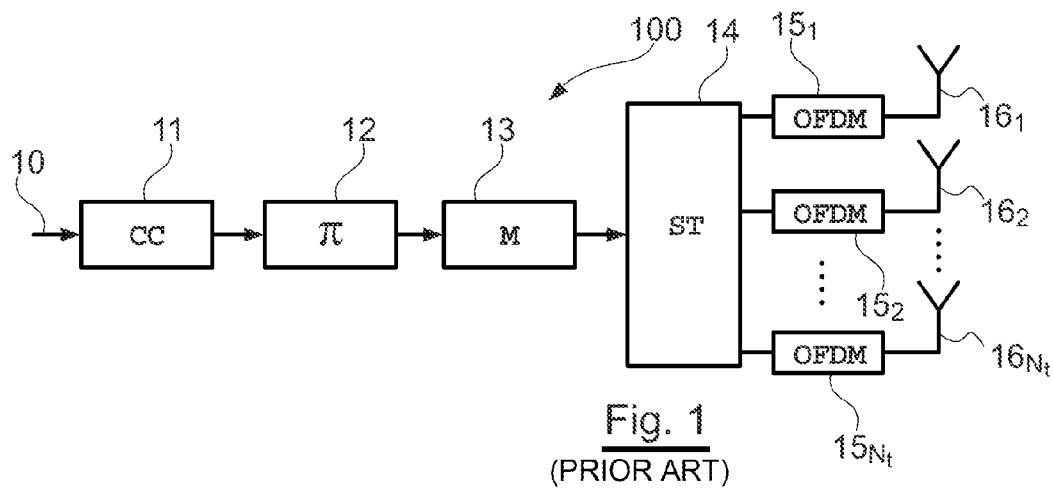
FIG. 1 already commented upon with reference to the prior art is a block diagram of the transmission scheme of a prior-art technique.
Figure 2:
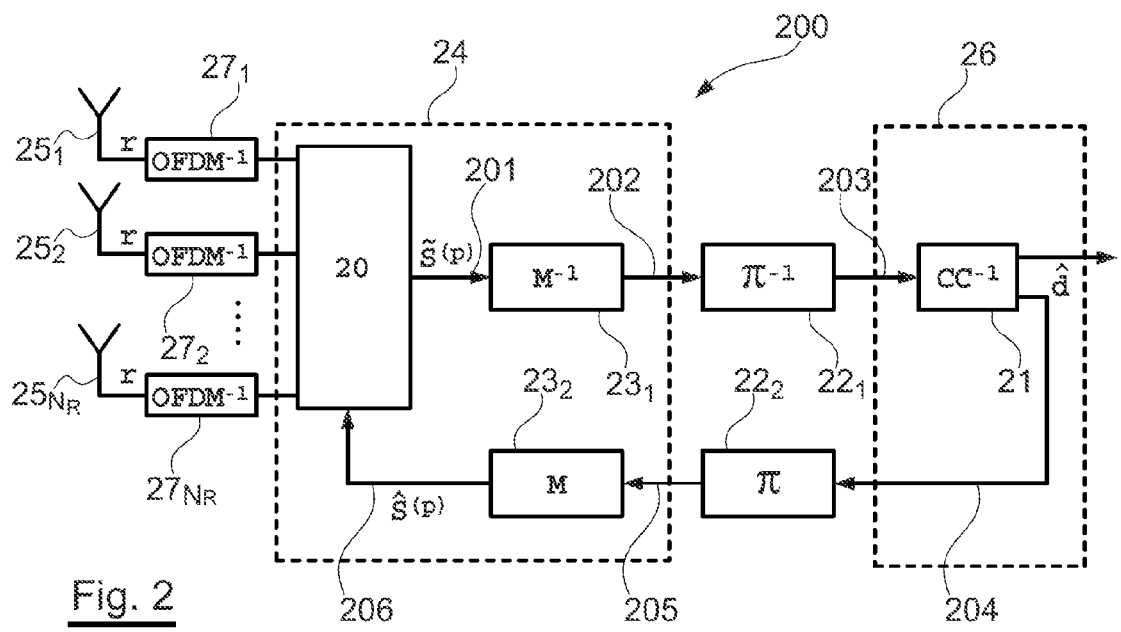
FIG. 2 also commented upon with reference to the prior art, illustrates the receiver of the signal sent according to the scheme of FIG. 1.

In this embodiment, the reception device 400 of the invention comprises:
- means for the block-to-block equalization 41 of a received signal, playing the role of a space-time decoding block 20 described with reference to FIG. 2; and
- means for the improvement 42 of an estimation of the received signal specific to an embodiment of the invention.

As shall be seen here below in the description, the improvement means 42 for improving an estimation of the received signal comprise a bit-to-bit channel decoding module $CC^{-1}$ 421 (also called means for obtaining a decoded bit) and means 43 for determining a block of equalized symbols improved by interference cancellation.

To put it in greater detail, the block-to-block equalization means 41 receive a received signal r (formed by blocks of received symbol), through $N_R$ reception antennas referenced $25_1$ to $25_{N_R}$, and output a block of equalized symbols (at least one symbol).

A "demapping" module $M^{-1}$ 423$_1$, which works symbol by symbol, receives the block of equalized symbols and delivers one or more converted bits.

After a certain latency, a de-interleaving module $\Pi^{-1}$ 422$_1$ implements a de-interleaving, which is the reverse of an interleaving implemented at transmission, of a subset of converted bits (at least one bit), so as to deliver, one by one, one or more de-interleaved bits In the present embodiment, the de-interleaving operation restores bits interleaved at transmission according to an interleaving mode distributing the bits so as to ensure that two bits of one of the blocks of symbols received are at a distance from one another, before interleaving, equal to a length greater than the length of the sequence of bits needed to decode one bit during channel decoding.

More specifically, the embodiment illustrated implements a de-interleaving module $\Pi^{-1}$ 422$_1$ sized $T=nb_{bloc}*Q*nb_{bit}$, where:
- $nb_{block}$ corresponds to the number of space-time blocks (i.e. blocks of symbols);
- Q corresponds to the number of symbols forming a space-time block;
- $nb_{bit}$ corresponds to the number of bits forming a symbol;

More specifically again, a de-interleaving of interleaved bits is carried out so that a bit which, before inter-leaving, occupies an initial positioned defined by:

$$b*Q*nb_{bit}+s*nb_{bit}+p$$

occupies a final position, after de-interleaving, defined by:

$$\Pi_p(p,s,\Pi_b(b))*Q*nb_{bloc}+\Pi_s(s,\Pi_b(b))*nb_{bloc}+\Pi_b(b),$$
where:

- $\Pi_b(b)$ designates the relationship enabling the distribution of the space-time blocks;
- $\Pi_s(s,\Pi_b(b))=(s-\Pi_b(b))\mod(Q)$ designates the relationship enabling the distribution of the symbols within the space-time blocks;
- $\Pi_p(p,s,\Pi_b(b))=(p-\Pi_b(b)-\epsilon*(\Pi_b(b)/Q)+\Pi_s(s,\Pi_b(b)))\mod(nb_{bit})$ designates the relationship enabling the distribution of the bits (i.e. dispersion of the position of the bits) within each symbol, with:

$$\varepsilon = \begin{cases} 1 & \text{if } Q\bmod(nb_{bit}) = 0 \\ 0 & \text{if } Q\bmod(nb_{bit}) > 0 \end{cases}$$

Thus, in this embodiment, the de-interleaving is such that two consecutive de-interleaved bits come from two distinct positions of bits within two blocks of distinct equalized symbols.

Naturally, in another embodiment, another de-interleaving scheme can be envisaged.

As illustrated in FIG. 4, a channel decoding module $CC^{-1}$ 421 implements a bit-to-bit decoding of a subset of de-interleaved bits (at least one bit), so as to deliver, one by one, one or more of the new decoded bits.

After a certain latency, an interleaving module $\Pi$ 422$_2$ implements a interleaving of a subset of bits (at least one new decoded bit), so as to deliver one (or more) of the new interleaved bits one by one.

As soon as a new interleaved bit is available at input of a "mapping" module M 423$_2$, this module outputs a new estimated symbol (also called an updated estimated symbol).

Finally, the determining means 43 update the cancellation of interferences on one of the symbols of the received signal r, from the new estimated symbol and from the previous estimated symbol or symbols so as to obtain an improved block of equalized symbols.

Figure 5:
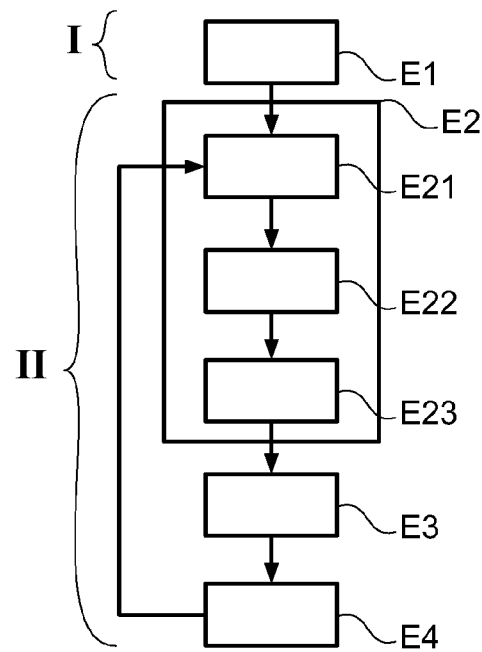
FIG. 5 is a flow chart of a particular embodiment of the reception method of the invention.

FIG. 5 presents a flow chart giving a comprehensive illustration of a method of reception of a data signal received according to a particular embodiment of the invention.

An initialization phase, referenced I, comprises a first step E1, during which a block-to-block equalization is done on a received signal formed by received symbol blocks so as to obtain, for each block of received symbols, a block of equalized symbols, each formed by a set of bits.

The following steps pertain to an iteration of improvement of an estimation of the received signal, referenced II, for a given block of equalized symbols, called a current block of equalized symbols.

At a step E2, a bit-to-bit decoding is done on a current subset of bits belonging to the current block of equalized symbols, so as to obtain one or more decoded bits.

More specifically, the step E2 comprises:
a step E21 in which one or more bits are extracted from one of the equalized symbols (of the current block of equalized symbols);
a step E22 in which the current subset of bits is updated, from the bit or bits extracted at the step E21;
a step E23 in which the subset of bits updated at the step E22 is decoded, so as the generate the above-mentioned decoded bit or bits.

Then, at a step E3, one or more symbols estimated at the initialization step I or updated during a previous improvement iteration are updated as a function of the decoded bit or bits obtained at the step E2, so as to obtain an updated block of estimated symbols.

Finally, at a step E4, the cancellation of interferences on one of the symbols of the received signal is updated as a function of the updated block of estimated symbols obtained at the step E3, so as to obtain an updated block of equalized symbols (here below called an improved block of equalized symbols). Since the method of reception is iterative, the operation returns to the step E2 at the end of the step E4. It will be noted that the improved block of equalized symbols becomes the current block of equalized symbols of the next iteration.

Figure 6A:
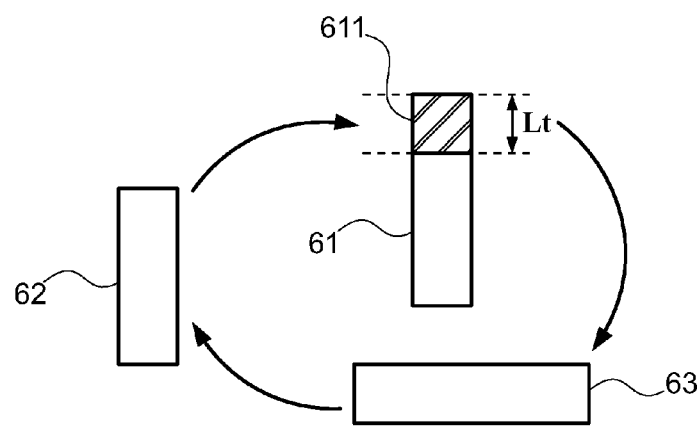
FIG. 6 provides a schematic illustration of the updating operations performed on the bits and symbols during an iteration of improvement of the estimation of the received signal of an embodiment of the invention.
Figure 6B:
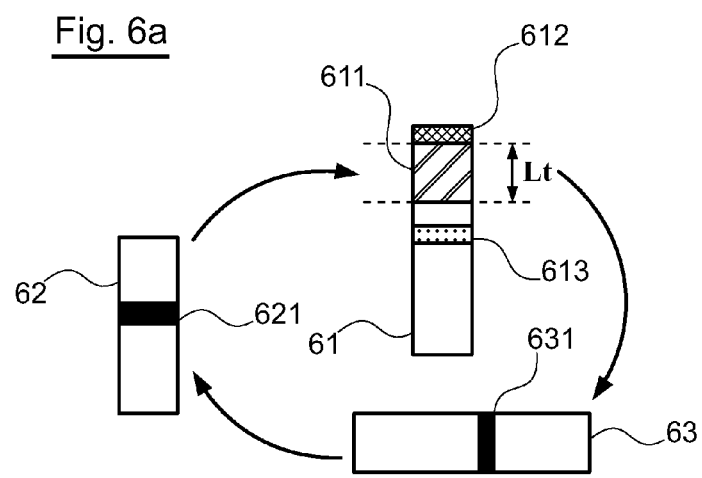
Figure 6C:
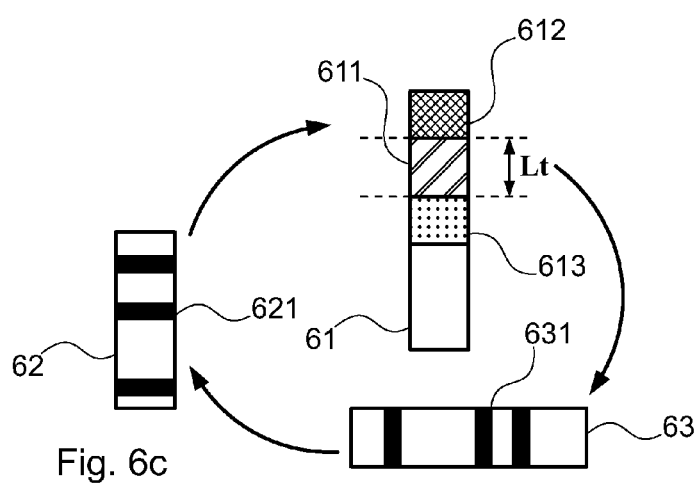

FIGS. 6a to 6c provide a schematic illustration of the (current) iteration of improvement of estimation of the received signal implemented according to a particular embodiment of the invention.

At the instant t0 (FIG. 6a) it is assumed that the current set of bits 61 to be decoded, the current block of equalized symbols 62 and the block of estimated symbols 63 come from a previous improvement iteration. At this very instant t0, the channel decoding (bit-to-bit decoding) is begun on the first bit of a current subset of bits 611, belonging to the current block of equalized symbols 62.

At the instant t0+1 (FIG. 6b), the channel decoding module $CC^{-1}$ 421 (referring to FIG. 4), as a function of its truncation Lt, processes Lt bits of the subset of bits 611 so as to obtain a first decoded bit 612. At this very same instant t0+1, an estimated symbol 631 (called an updated estimated symbol) of the block of estimated symbols 63 is updated on the basis of the first decoded bit 612 and one or more bits obtained at the previous iteration. Again at this very same instant t0+1, the interference cancellation on one of the symbols of the received signal is updated on the basis of the updated estimated symbol 631 and one or more symbols estimated at the previous iteration so as to obtain an updated equalized symbol 621 (also called an improved equalized symbol). Again at this same instant t0+1, a bit (called an extracted bit) is extracted from the updated equalized symbol 621 and then inserted 613 into the subset of bits 611.

It is important to note that in order to be used at the current iteration, the extracted bits 613 must be placed in the current set of bits 61 to be decoded after the zone that is in the course of being decoded. If not, it will not be used until the next iteration. This distribution of course depends directly on the interleaving scheme implemented by the interleaving module Π $422_2$ (with reference to FIG. 4).

At the instant t0+p (FIG. 6c), the pth decoded bit will be used, with bits decoded at this iteration (t0+p) or at the previous iteration, to recreate a new updated estimated symbol. This new updated estimated symbol and other symbols estimated at this iteration (t0+p) or at the previous iteration will enable the interference cancellation to be updated in order obtain a new updated equalized symbol of which one bit will be extracted to be inserted into the current set of bits 61 to be decoded.

Figure 7:
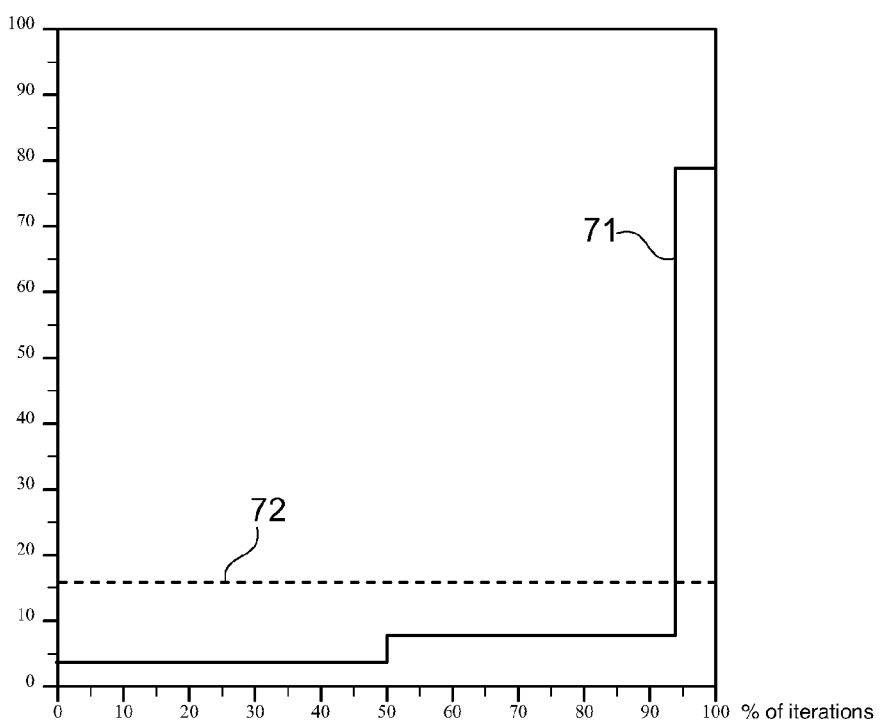
FIG. 7 presents the number of iterations to be performed during an iteration by an iterative receiver of an embodiment of the invention.

Referring now to FIG. 7, we present the performance values of the reception method of an embodiment of the invention, these performance values being obtained by simulation of a 2×2 MIMO system with a linear dispersion code transmitting four symbols in blocks. This system implements a 16 QAM type modulation with Gray mapping, a 2400-bit interleaving and a convolutive encoding with an efficiency of ½.

More specifically, FIG. 7 shows two curves referenced 71 and 72 illustrating the number of operations to be performed after each bit decoded as a function of the evolution of an iteration (expressed in percentages (%) with 0% corresponding to the start of the iteration and 100% to the end of the iteration) for a classic MMSE-IC type receiver and the receiver of an embodiment of the invention respectively.

As illustrated in FIG. 7, the receiver of an embodiment of the invention shows satisfactory performance since it reduces processing time by about 50% relative to a classic receiver. In other words, for identical processing times, the receiver of an embodiment of the invention carries out about 5 times fewer operations (16 operations instead of 79).

Figure 8:
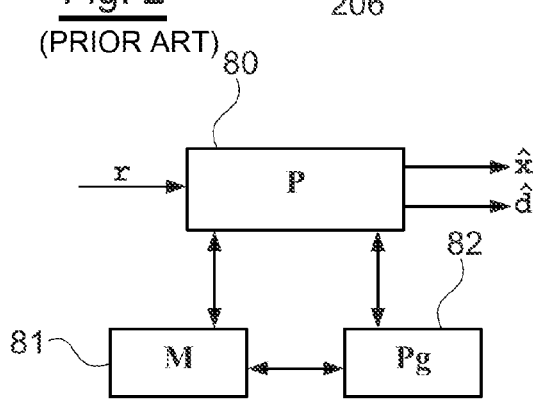
FIG. 8 is a simplified block diagram of a receiver of an embodiment of the invention.
Figure 3:
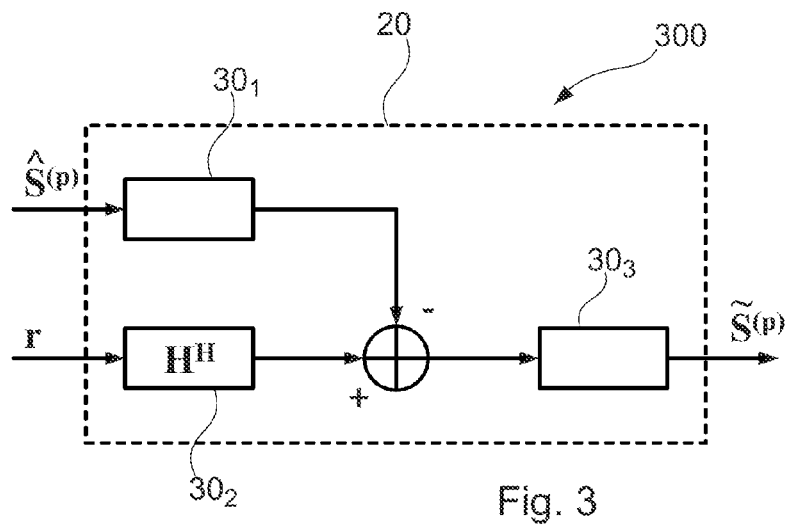
FIG. 3 also commented upon with reference to the prior art presents an elementary module of the receiver of FIG. 2 implementing an interference cancellation.

FIG. 8 finally presents a simplified block diagram of the iterative receiver of an embodiment of the invention, which comprises a memory M 81, a processing unit 80 equipped for example with a microprocessor and driven by the computer program Pg 82. At initialization, the code instructions of the computer program 82 are loaded into a RAM 81 and then executed by the processor of the processing unit 80. At input, the processing unit 80 receives the received data signal r. The microprocessor μP of the processing unit 80 carries out the iterative equalization and estimation of the signal, described with reference to FIGS. 4, 5 and 6, according to the instructions of the program Pg 82. The processing unit 80 outputs an estimated (binary) signal d̂ and an estimated M-ary signal x̂.

It will be noted that the invention is not limited to a purely hardware implantation but that it can also be implemented in the form of a sequence of instructions of a computer program or any other form combining a hardware part and a software part. Should an embodiment of the invention be implanted partially or totally in software form, the corresponding sequence of instructions could be stored in a detachable storage means (such as for example a floppy, a CD-ROM or a DVD-ROM) or in a non-detachable storage means, this storage means being partially or totally readable by a computer or a microprocessor.

Although the present disclosure has been described with reference to one or more examples, workers skilled in the art will recognize that changes may be made in form and detail without departing from the scope of the disclosure and/or the appended claims.

The invention claimed is:

1. Method of reception of a received data signal formed by at least one received block of symbols and representing a source signal, said method comprising:
    implementing an initialization phase comprising block-to-block equalization of said received signal, delivering for each block of received symbols, a block of equalized symbols each formed by one set of bits; and
    at least one iteration of improvement of an estimation of said received signal comprising the following steps, for a current block of equalized symbols:

obtaining at least one decoded bit, by bit-to-bit decoding of a current subset of at least one bit belonging to said current block of equalized symbols;

updating at least one symbol estimated during said initialization phase or updated during a previous iteration of improvement, as a function of the decoded bit or bits, delivering an updated block of estimated symbols, constituted by the decoded bit or bits and at least one bit decoded during at least one previous improvement iteration or during said initialization phase;

determining an improved block of equalized symbols by cancellation of interference, taking account of said updated block of estimated symbols, said improved block of equalized symbols becoming the current block of equalized symbols of any subsequent iteration.

2. Method of reception according to claim 1, wherein said obtaining step comprises the following steps:

extracting at least one bit from one of said equalized symbols, called extracted bits;

updating said current subset from at least one of said extracted bits, delivering an updated subset;

channel decoding of said updated subset, delivering the decoded bit or bits.

3. Method of reception according to claim 1, wherein said obtaining step implements a de-interleaving of said sets of bits of said equalized symbols of said current block of equalized symbols, which is the reverse of an interleaving implemented at transmission.

4. Method of reception according to claim 3, wherein said de-interleaving renders, in an original order, the bits interleaved at transmission according to a interleaving that distributes said bits uniformly in said blocks of symbols and ensures that two bits consecutively associated with a symbol block will be transmitted in two distinct symbols.

5. Method of reception according to claim 3, wherein said de-interleaving is such that two consecutive de-interleaved bits come from two distinct positions of bits within two distinct blocks of equalized symbols.

6. Method of reception according to claim 5, wherein, for an interleaver sized $T=nb_{bloc}*Q*nb_{bit}$ and for a given bit which, before de-interleaving, occupies an initial position defined by:

$$b*Q*nb_{bit}+s*nb_{bit}+p$$

said de-interleaving is such that said given bit, after de-interleaving, occupies a final position defined by:

$$\Pi_p(p,s,\Pi_b(b))*Q*nb_{bloc}+\Pi_s(s,\Pi_b(b))*nb_{bloc}+\Pi_b(b)$$

where:

$nb_{block}$ corresponds to the number of blocks of symbols;

Q corresponds to the number of symbols forming one of said blocks;

$nb_{bit}$ corresponds to the number of bits forming one of said symbols;

$\Pi_b$ (b) designates a relationship enabling distribution of the blocks of symbols;

$\Pi_s$ $(s\Pi_b$ (b)$)=(s-\Pi_b(b))\mod(Q)$ designates a relationship enabling distribution of the symbols within each block of symbols;

$\Pi_p(p,s,\Pi_b(b))=(p-\Pi_b(b)-\epsilon*(\Pi_b(b)/Q)+\Pi_s(s,\Pi_b(b)))\mod(nb_{bit})$ designates a relationship enabling distribution of the bits within each symbol;

with:

$$\varepsilon = \begin{cases} 1 & i \;\; Q\mathrm{mod}(nb_{bit}) = 0 \\ 0 & i \;\; Q\mathrm{mod}(nb_{bit}) > 0 \end{cases}.$$

7. Device for reception of a received data signal formed by at least one received block of symbols representing a source signal, said device comprising:

initialization means comprising means of block-to-block equalization of said received signal, delivering for each block of received symbols, a block of equalized symbols each formed by one set of bits, means of improvement of an estimation of said received signal, implementing at least once, in the form of an iteration and for a current block of equalized symbols:

means for obtaining at least one decoded bit, by bit-to-bit decoding of a current subset of at least one bit belonging to said current block of equalized symbols;

means for updating at least one symbol estimated during said initialization phase or updated during a previous iteration of improvement, as a function of the decoded bit or bits, delivering an updated block of estimated symbols, constituted by the decoded bit or bits and at least one bit decoded during at least one previous improvement iteration or during said initialization phase;

means for determining an improved block of equalized symbols by cancellation of interference, taking account of said updated block of estimated symbols, said improved block of equalized symbols becoming the current block of equalized symbols of any subsequent iteration.

8. Computer program product recorded on a computer-readable carrier and which comprises program code instructions for execution of a method of receiving a received data signal formed by at least one received block of symbols and representing a source signal, when said program is executed on a computer, wherein the method comprises:

implementing an initialization phase comprising block-to-block equalization of said received signal, delivering for each block of received symbols, a block of equalized symbols each formed by one set of bits; and at least one iteration of improvement of an estimation of said received signal comprising the following steps, for a current block of equalized symbols:

obtaining at least one decoded bit, by bit-to-bit decoding of a current subset of at least one bit belonging to said current block of equalized symbols;

updating at least one symbol estimated during said initialization phase or updated during a previous iteration of improvement, as a function of the decoded bit or bits, delivering an updated block of estimated symbols, constituted by the decoded bit or bits and at least one bit decoded during at least one previous improvement iteration or during said initialization phase;

determining an improved block of equalized symbols by cancellation of interference, taking account of said updated block of estimated symbols, said improved block of equalized symbols becoming the current block of equalized symbols of any subsequent iteration.

* * * * *